United States Patent
Asaftei et al.

(10) Patent No.: US 10,748,171 B2
(45) Date of Patent: Aug. 18, 2020

(54) AUTOMATED MARKETING RATE OPTIMIZER

(71) Applicant: INTERNATIONAL BUSINESS MACHINES CORPORATION, Armonk, NY (US)

(72) Inventors: Gabriel Asaftei, New York, NY (US); Munish Goyal, Yorktown Heights, NY (US); Qin S. Held, Midland Park, NJ (US); Steven M. O'Brien, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 15/265,050

(22) Filed: Sep. 14, 2016

(65) Prior Publication Data

US 2018/0075476 A1    Mar. 15, 2018

(51) Int. Cl.
*G06Q 30/02* (2012.01)

(52) U.S. Cl.
CPC ................. *G06Q 30/0244* (2013.01)

(58) Field of Classification Search
USPC ................................. 705/14, 319
See application file for complete search history.

(56) References Cited

U.S. PATENT DOCUMENTS

| | | | | |
|---|---|---|---|---|
| 8,032,508 B2 * | 10/2011 | Martinez | ............. | G06F 16/9535 707/708 |
| 2003/0182171 A1 * | 9/2003 | Vianello | ........ | G06Q 10/063112 705/7.14 |
| 2005/0209909 A1 * | 9/2005 | Dull | ................. | G06Q 10/06375 705/7.32 |
| 2007/0244741 A1 * | 10/2007 | Blume | ................... | G06Q 30/02 705/7.31 |
| 2008/0243607 A1 * | 10/2008 | Rohan | .................... | G06Q 30/02 705/14.69 |

(Continued)

FOREIGN PATENT DOCUMENTS

WO    WO2011036673 A2    3/2011

OTHER PUBLICATIONS

Robert Shaw Shaw, Robert Bruce, Trust and distrust in organizations: An intergroup analysis, Jan. 1, 1989 (Year: 1989).*

(Continued)

*Primary Examiner* — Gautam Ubale
(74) *Attorney, Agent, or Firm* — Patrick J. Daugherty; Daugherty & Del Zoppo Co., LPA

(57) ABSTRACT

Aspects automatically minimize marketing rates as a function of optimized response rate models. Response rates are estimated from marketing offers targeted from a first entity to topic-entity pairs at respective specified marketing rates as a function of relative differences in their consumer sentiment scores. Marketing offers are targeted to a subset of the topic-entity pairs that each have estimated response rates meeting a threshold response rate constraint. Respective costs and actual rates of response from consumers are determined for the targeted offers. Response rates are modeled to determine modeled response parameters for the topics and entities of the subset topic-entity pairs as regressions of minimized differences in value between estimated and actual response rates. Marketing rates of the subset entity-topic pairs are minimized to meet the threshold response rate constraint and a marketing cost constraint as a function of the modeled response parameters.

14 Claims, 4 Drawing Sheets

(56) References Cited

U.S. PATENT DOCUMENTS

| | | | | |
|---|---|---|---|---|
| 2009/0240558 A1* | 9/2009 | Bandy | ................ | G06Q 30/0201 705/7.29 |
| 2009/0307052 A1* | 12/2009 | Mankani | ................ | G06Q 10/06 705/7.17 |
| 2010/0088138 A1* | 4/2010 | An | ................ | G06Q 10/06 705/7.17 |
| 2010/0106568 A1* | 4/2010 | Grimes | ................ | G06Q 30/02 705/14.1 |
| 2010/0228636 A1* | 9/2010 | Silverman | ................ | G06Q 30/02 705/14.72 |
| 2010/0274661 A1* | 10/2010 | Aaltonen | ................ | G06Q 30/02 705/14.42 |
| 2011/0276507 A1* | 11/2011 | O'Malley | ................ | G06Q 10/1053 705/321 |
| 2013/0185218 A1* | 7/2013 | Hermsdorff | ................ | G06Q 10/1053 705/321 |
| 2013/0231974 A1* | 9/2013 | Harris | ................ | G06Q 30/0201 705/7.29 |
| 2014/0200941 A1* | 7/2014 | McDaniel | ................ | G06Q 10/06311 705/7.16 |
| 2014/0258161 A1* | 9/2014 | Brown | ................ | G06Q 10/1053 705/321 |
| 2014/0316883 A1* | 10/2014 | Kitts | ................ | G06Q 30/0242 705/14.45 |
| 2015/0106078 A1* | 4/2015 | Chang | ................ | G06F 16/35 704/9 |
| 2015/0206153 A1* | 7/2015 | Lee | ................ | G06Q 30/0201 705/7.29 |
| 2015/0248693 A1* | 9/2015 | Dubey | ................ | G06Q 30/0244 705/14.43 |
| 2016/0292722 A1* | 10/2016 | Myers | ................ | G06F 16/9535 |
| 2016/0379244 A1* | 12/2016 | Kalish | ................ | G06N 20/00 705/14.41 |

OTHER PUBLICATIONS

Trust and Distrust in Organizations An Intergroup Analysis (Year: 2019).*

Peter Mell et al, The NIST Definition of Cloud Computing, National Institute of Standards and Technology, Publication 800-145, 2011.

Yong Jian Wang et al, Superstitious beliefs in consumer evaluation of brand logos, Implications for corporate branding strategy, European Journal of Marketing, Emerald Group Publishing Limited, 2012.

Rachael King, How Do Employees Really Feel About their Companies?, Dow Jones & Company, Inc., 2016.

* cited by examiner

AUTOMATED MARKETING RATE OPTIMIZER

BACKGROUND

Offers for products or services to consumers must generally compete with offers from competitors. For example, employees with high-demand skills may have choices between employment offers from a wide variety of competing, potential employers. Moreover, the Internet, social media and other networked resources have revolutionized the way people learn about and apply for jobs with employers. Information about an employer is easy to ascertain via a candidate's web browser, without requiring an on-sight visit or in-person review with an employer or representative. This additional consumer information is outside the control of the competing employers presenting employment offers to the same candidate, and therefore hard to account for in the effective marketing of offers to candidates (consumers).

Demands and forums for reaching consumers continue to evolve and shift. In the example of candidate employment, talent acquisition tasks overlap with marketing efforts. In one survey slightly more than six in ten executives (62 percent) report that they rely on social networking tools for sourcing and advertising positions. Employers often intentionally or unintentionally leverage their presence on media and social networking sites to build a compelling employment brand that is useful in marketing their companies to passive job candidates (those not actively seeking employment with the employer).

BRIEF SUMMARY

In one aspect of the present invention, a computerized method for automatically minimizing marketing rates as a function of optimized response rate models executes steps on a computer processor. Thus, response rates are estimated from consumers to marketing offers targeted from a first entity to a each of topic-entity pairs at respective specified marketing rates, the estimating a function of relative differences in consumer sentiment scores determined for each of the topic-entity pairs, and wherein entities of the topic-entity pairs are chosen from a plurality of competitor entities that is not inclusive of the first entity. Marketing offers are made at their respective specified marketing rates to consumers that are targeted to respective ones of a subset of the topic-entity pairs that each have estimated response rates that meet a threshold response rate constraint. Respective costs and actual rates of response from the consumers are determined for the offers targeted to the subset of the topic-entity pairings. Response rates are modeled to determine response parameters for respective ones of topic and entity of the subset topic-entity pairs as regressions of minimized differences in value between the estimated and the actual response rates of respective ones of the subset entity-topic pairs. Respective specified marketing rates of the subset entity-topic pairs are minimized to meet the threshold response rate constraint and a marketing cost constraint as a function of the modeled response parameters.

In another aspect, a system has a hardware processor in circuit communication with a computer readable memory and a computer-readable storage medium having program instructions stored thereon. The processor executes the program instructions stored on the computer-readable storage medium via the computer readable memory and thereby estimates response rates from consumers to marketing offers targeted from a first entity to a each of topic-entity pairs at respective specified marketing rates, the estimating a function of relative differences in consumer sentiment scores determined for each of the topic-entity pairs, and wherein entities of the topic-entity pairs are chosen from a plurality of competitor entities that is not inclusive of the first entity. Marketing offers are made at their respective specified marketing rates to consumers that are targeted to respective ones of a subset of the topic-entity pairs that each have estimated response rates that meet a threshold response rate constraint. Respective costs and actual rates of response from the consumers are determining for the offers targeted to the subset of the topic-entity pairings. Response rates are modeled to determine response parameters for respective ones of topic and entity of the subset topic-entity pairs as regressions of minimized differences in value between the estimated and the actual response rates of respective ones of the subset entity-topic pairs. Respective specified marketing rates of the subset entity-topic pairs are minimized to meet the threshold response rate constraint and a marketing cost constraint as a function of the modeled response parameters.

In another aspect, a computer program product for automatically minimizing marketing rates as a function of optimized response rate models has a computer-readable storage medium with computer readable program code embodied therewith. The computer readable hardware medium is not a transitory signal per se. The computer readable program code includes instructions for execution which cause the processor to estimate response rates from consumers to marketing offers targeted from a first entity to a each of topic-entity pairs at respective specified marketing rates, the estimating a function of relative differences in consumer sentiment scores determined for each of the topic-entity pairs, and wherein entities of the topic-entity pairs are chosen from a plurality of competitor entities that is not inclusive of the first entity. Marketing offers are made at their respective specified marketing rates to consumers that are targeted to respective ones of a subset of the topic-entity pairs that each have estimated response rates that meet a threshold response rate constraint. Respective costs and actual rates of response from the consumers are determined for the offers targeted to the subset of the topic-entity pairings. Response rates are modeled to determine response parameters for respective ones of topic and entity of the subset topic-entity pairs as regressions of minimized differences in value between the estimated and the actual response rates of respective ones of the subset entity-topic pairs. Respective specified marketing rates of the subset entity-topic pairs are minimized to meet the threshold response rate constraint and a marketing cost constraint as a function of the modeled response parameters.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
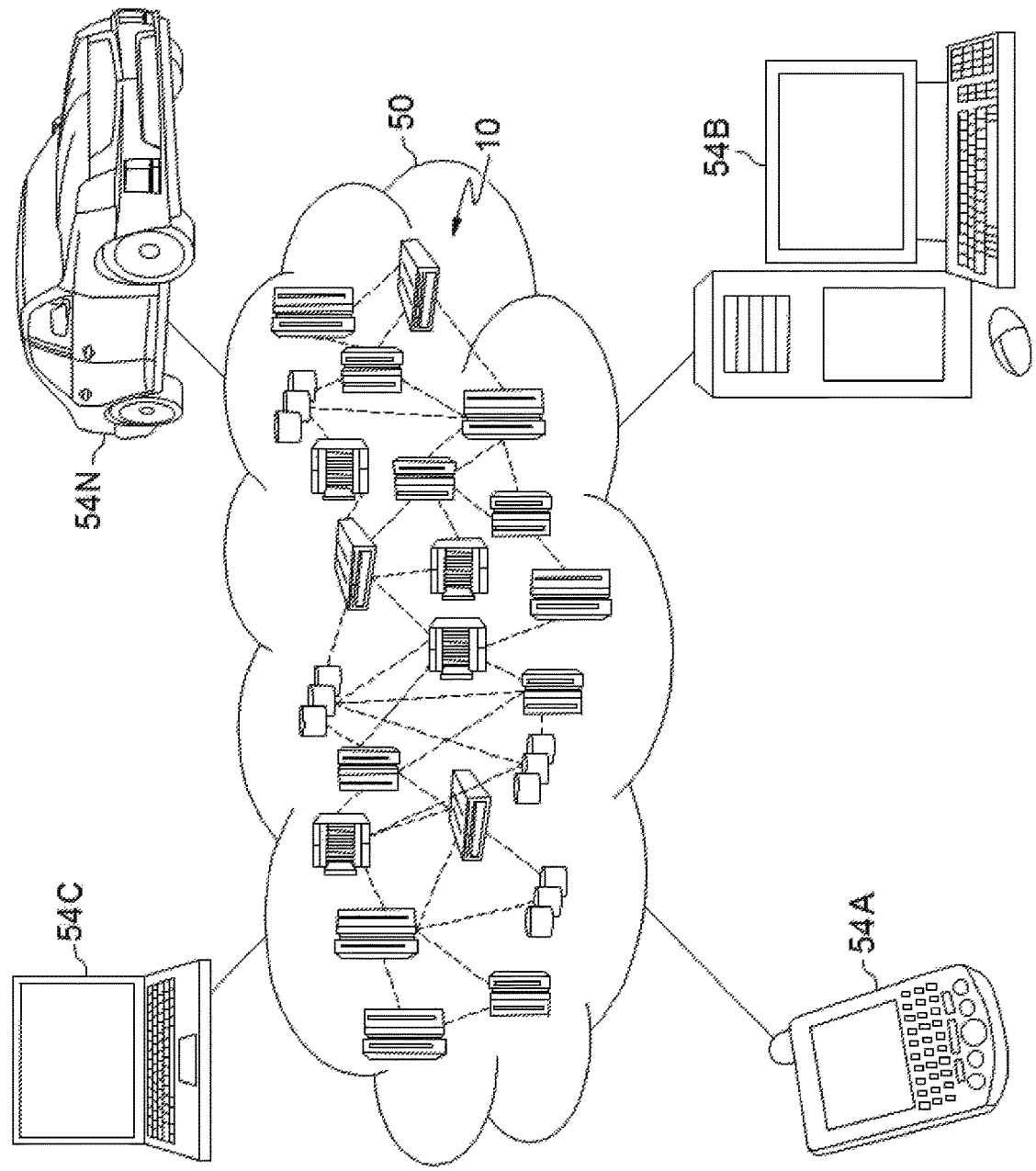
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
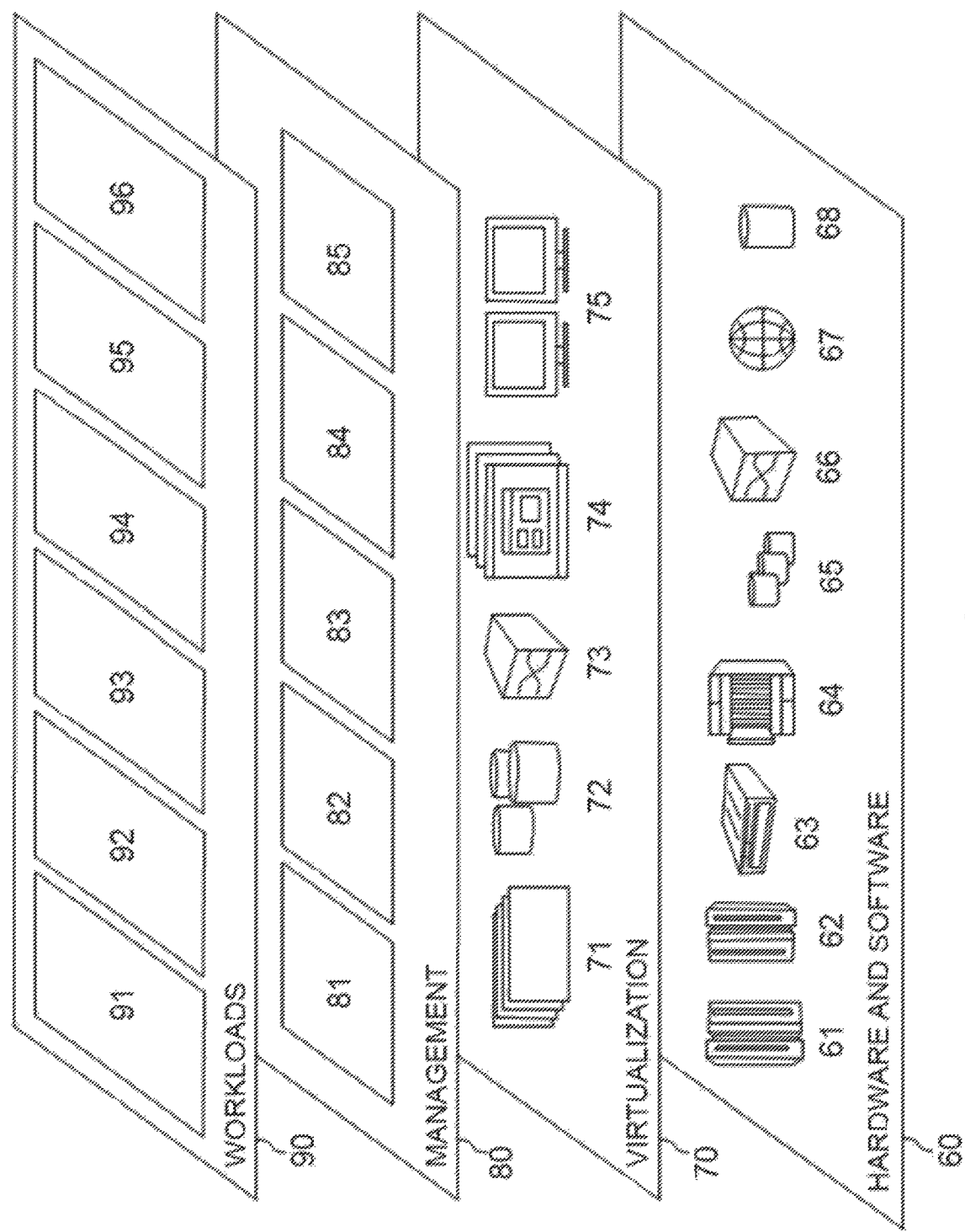
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
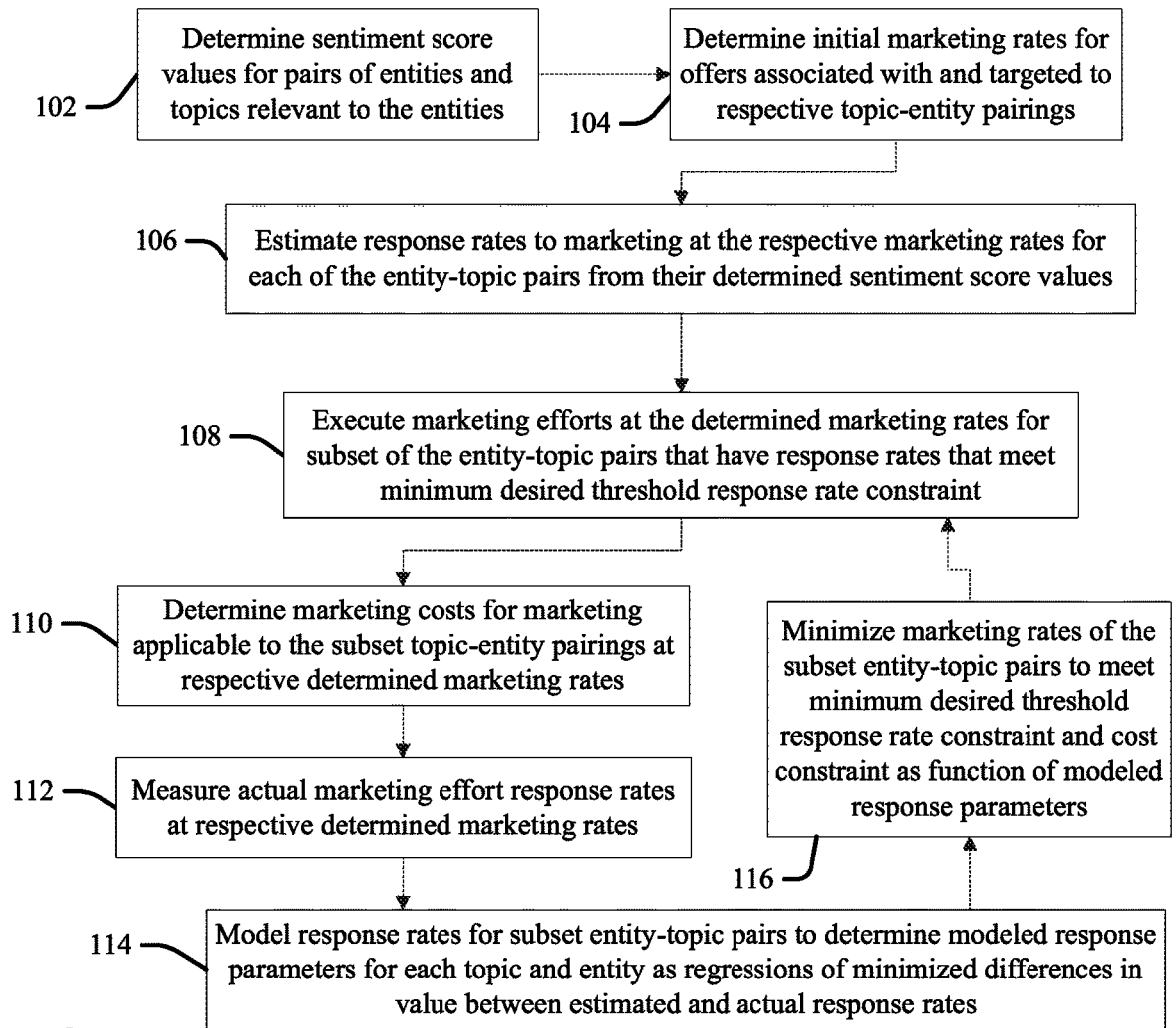
FIG. 4 is a flow chart illustration of a process or system for automatically minimizing marketing rates as a function of optimized response rate models according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for automatically minimizing marketing rates as a function of optimized response rate models according to embodiments of the present invention, for example to execute the process steps or system components or tasks as depicted in FIG. 4 below.

Figure 3:
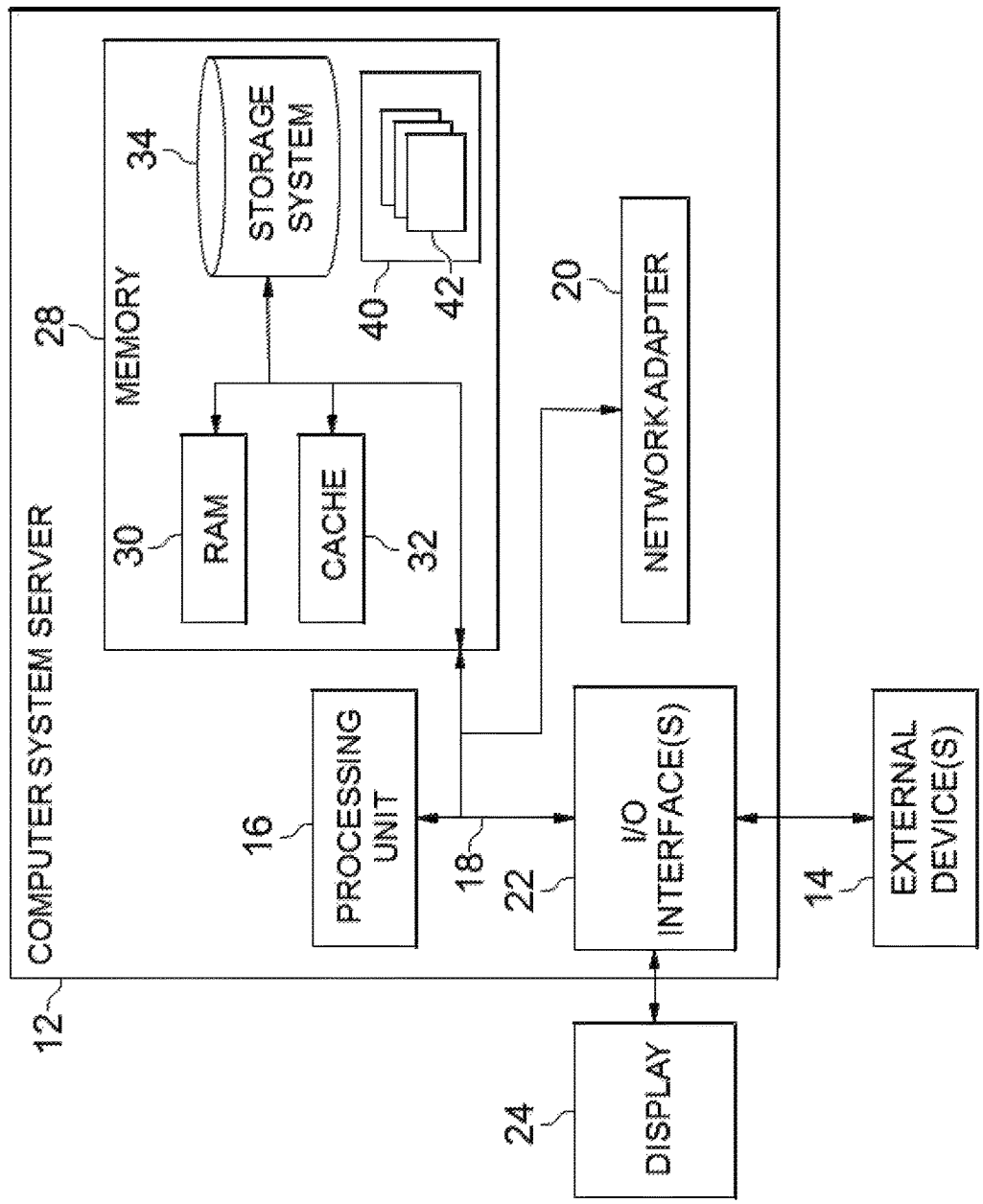
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a method or process according to an aspect of the present invention wherein a processor of a programmable device automatically minimizes marketing rates as a function of optimized response rate models. At 102 consumer sentiment score or values are determined for different respective topic and competitor pairings. The topics are different attributes or qualities applicable to each of a plurality of different competitors for the attention of the consumer, wherein the consumer assigns values to the topics that are useful in distinguishing the competitors and their offers of goods or services to the consumer, reflecting relative qualities of the relevant competing entities with respect to each topic as determined from consumer opinion, selection behavior and other sentiment indicators.

The sentiment scores are generally quantified at 102 in terms of positive or negative values that reflect the relative quality of the competing entities (sometimes referred to as "competitors") with respect to each topic as determined from consumer sentiment, and thus absolute value metrics of the scores may be compared to a threshold. The sentiment score values may be based on survey answers, social network system postings and ratings, media reports, etc., of customer (consumer) sentiments expressed relative to different retailer or wholesaler entities on product or service quality or pricing attributes; of employees (as consumers) with regard to different employer entities on compensation or quality of life or opportunity of advancement attributes; of students, parents of students or employers (as consumers) with regard to different school entities on graduation rate or quality of life or employment rate after graduation attributes; and still other methodology and consumer entity topic or attributes parings will be apparent to one skilled in the art.

At 104 initial marketing rates are determined for offers associated with and targeted to respective topic-entity pairings from historic data. The marketed offers are from a first entity and targeted to the entities of the topic-entity pairs as competitor entities (that are not inclusive of the first entity), the offers for the consumers to choose the first entity over the competitor entities for obtaining services or goods. Appropriate marketing rates are generally indicated or determine at 104 as a function of historical marketing response data including rates or frequency of email, targeted and general advertising, event sponsorships, etc., that have been shown to generate a minimum or threshold desired response rate when targeted to an entity within a selected pairing that meets features data of the historic data (an attribute topic name, employer name, month of the year, dynamic macro-economic indicators, relative sentiment scores and differential scores over time, etc.).

At 106 initial estimated response rates are determined for each of the entity-topic pairs to marketing efforts at the respective current (initial) marketing rates for each of the entity-topic pairs as function of values of consumer sentiment scores determined for each of the topic-entity pairs. In some aspects the initial response rates are estimated as a function of historic response data associated with the topic-entity pairs and with the determined sentiment score values, determined from historic outreach to another competitor who had similar feature vectors and consumer sentiment scores on the same topic. In some aspects historical data of responses of general marketing to each of the topics and employers within each pairing are used to determine appropriate rates of a marketing, for example, numbers or frequency of email, targeted and general advertising, event sponsorships, etc., that have been shown to generate a minimum or threshold desired response rate [R(t)).

At 108 marketing efforts are executed at the determined marketing rates to a subset of the entity-topic pairs that having estimated response rates that meet a minimum desired threshold response rate constraint. Thus, the pairs for which expected (modelled) response rates will not meet the minimum threshold are excluded from the marketed offers.

At 110 marketing costs are determined for the marketing efforts directed to the selected subset of the topic-entity pairings at the determined marketing rates. Marketing costs considered include email, public event sponsorship, advertising, publication creation and distribution costs, etc. Some marketing efforts may be more appropriate to a certain attributes than others (for example, direct mail with regard to general work/life quality issue topics, or general advertising with regard to salary issues in order to assure privacy), or to certain consumers relative to others (public employers may make employee contact information publically available, wherein private employers may keep this information confidential, raising the cost of determining employee email addresses). Accordingly, the marketing costs will generally vary as a function of relative differences in attribute or entity from pair to pair.

At 112 actual response rates to the marketing efforts are measured, tabulated or otherwise observed at the determined marketing rates. Examples of response rates include rates of replies from job or sale offer emails to candidates, secondary or follow-up inquiries or communications from said candidates, etc.

At 114 response rates are modelled for the subset entity-topic pairs to determine response parameters for each topic and entity as regressions of minimized differences in value between the estimated and actual response rates.

At 116 the marketing rates of the subset entity-topic pairs are minimized to meet the minimum desired threshold response rate constraint and a marketing cost constraint as a function of the determined response parameters (thus as a function of the determined marketing costs), and the process loops back to execute another round of marketing efforts of the subset of the entity-topic pairs at 108.

Thus, each integration of the process at 108 through 116 results in further learning and refinement of response parameters, and thereby of the modelled response rates for the subset entity-topic pairs, until the difference (or error) between estimated response rate and the measured response rate decreases to zero, wherein the parameters used in the model stabilize or converge to a stable value.

Figure 5:
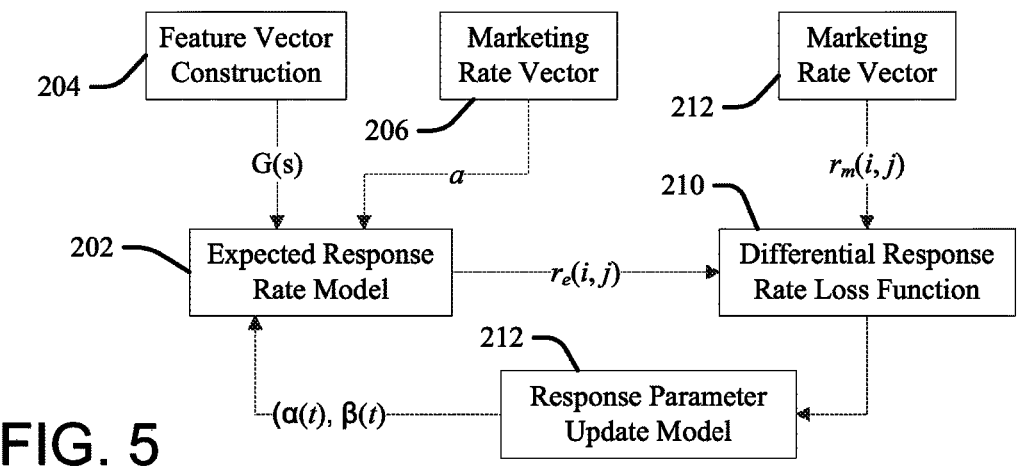
FIG. 5 is a flow diagram illustration of another process or system for automatically minimizing marketing rates as a function of optimized response rate models according to an aspect of the present invention.

FIG. 5 illustrates one aspect of the present invention that determines the consumer sentiment score values for topic [i] and competitor [j] pairings [(i, j)] (at 102, FIG. 4) as differential scores determined between score values at an initial point in time to scores determined for the same topic at a subsequent, later point in time (for example, a current time of inquiry), which may be denoted as [S(i, j)], as a function of their differential values [d], which may be described according to expression ("Exp.") (1):

$$d_t(i,j)=r_t(i,j)-r_0(i,j);$$

$$S_t(i,j)=<i,j,d(i,j)> \quad \text{Exp. (1)}$$

In some aspects the later time is chosen by a specified interval from the initial time (for example, a month later, a quarter of a calendar year later, two months later, one year later, etc.), though any time difference may be chosen and utilized as desired by a user.

Revised estimated response rates for the subset entity-topic pairs are modelled (at 114, FIG. 4) in an Expected Response Rate Model 202 (denoted as [F(α, β, G(s), a)]), which is a function of values of the pair of regressive response parameters [(α(t), β(t)] determined at a current time [t] for the entity and topic respectively. A Feature Vector Construction 204 (denoted as [G(s)]) of states of the respective entity-topic pairs captures topic name, entity name, differential sentiment score value and dynamic macro or microeconomic data relevant to the entity name over the differential sentiment score time period; and an action vector 206 representing the current determined marketing rate [a] for the pair.

A Differential Response Rate Loss Function 210 measures an error [Δe] between current estimated response rates for the topic pairs $[r_e(i, j)]$ determined by the Expected Response Rate Model 202. A Marketing Rate Vector 212 comprises an output of the measured response rates denoted as $[r_m(i, j)]$ (as determined at 112, FIG. 4) to a Differential Response Rate Loss Function 210 that generates an output to A Response Parameter Update Model 212, via an exemplary process denoted by the following expression (2):

$$[\Delta e(r_e(i,j)-r_m(i,j)] \quad \text{Exp. (2).}$$

The Response Parameter Update Model 212 uses the output of the Differential Response Rate Loss Function 210 to update values of the response parameters as a function of respective learning parameters $[\theta_\alpha, \theta_\beta]$ that control the speed of learning of the values of the respective parameters. The Response Parameter Update Model 212 may be denoted by the following Expression (3):

$$[\alpha(t+1)=\alpha(t)+\theta_\alpha(\Delta e(r_e(i,j)-r_m(i,j)));$$

$$\beta(t+1)=\beta(t)+\theta_\beta(\Delta e(r_e(i,j)-r_m(i,j)))] \quad \text{Exp. (3).}$$

In some aspects the marketing rates [a(i, j)] of the subset entity-topic pairs are minimized (at 116, FIG. 4) in a stochastic model function according to expression (4):

$$\min\_\{a(i,j)\}E[\Sigma_i\Sigma_j r_e(S(i,j),a(i,j)-R(t))^2+\lambda^*C(a(i,j))] \quad \text{Exp. (4).}$$

The expression component $[\Sigma_i \Sigma_j r_e(S_t(i, a(i, j))]$ estimates a total expected response rate from all topic-employer pairs and selected action rates that meet the desired threshold response rate constraint [R(t)]. The expression therefore minimizes the mean squared error between the total estimated and the desired response rates.

The expression component $[\lambda^*C(a(i, j))]$ penalizes for the marketing action costs [C(a(i, j))] (determined at 110, FIG. 4), wherein costly actions are not desirable unless the returns are substantially higher. A shadow price parameter [λ] accounts for an available marketing budget, wherein the higher the value of the shadow price parameter the smaller the allowable budget. Given a specified budget amount, the shadow price parameter may be selected to satisfy a budget constraint.

In the prior art employee candidate recruiters manually scour and analyze massive amount of unstructured and structured dynamic data, wherein the volumes of data appropriate for extraction and other analysis may be scattered over many internet sources, leading to inefficiencies and information overload. Recruiters in prior art processes struggle to filter out noise and extract or otherwise identify the most compelling arguments to use in their pitches to potential candidates. It is difficult in the prior art to use advanced analytics across different companies to evaluate accurately how an organization is perceived as an employer, what is impacting an organization's employment brand, or how other competitors are positioned and perceived. Employees may express positive or negative sentiments in forms and jargon that are idiosyncratic to a particular employer, work area or industry, wherein such forms are difficult to understand or translate to apply to other employers within the same or related work area or industry, limiting the applicability, scale and leverage of the information for employee recruitment efforts within the relevant work area or industry.

One aspect according to the present invention deploys the processes or systems of FIGS. 4 and 5 in the recruitment of employees as customers from competitor employers as entities, and wherein the topics are relevant to employment by the recruiting and competitor employers. Sentiment score values are determined (at 102, FIG. 4) for a first employer with respect to a plurality of employment topics at an initial point in time, as applied to the first employer. The sentiment score values represent positive or negative evaluations of the employer by employees, customers, analysts, consumers, media, etc., on topics that are each relevant to desirability of the employee to remain with the employer. The score provides an objective metric value that is comparable between different employers. Illustrative but not limiting or exhaustive topic examples include general management quality, compensation amounts, health benefit values, reward values of employee award and recognition programs, perceived work culture, career advancement opportunities, learning opportunities, employer financial health, strategic growth outlook, market risks applicable to the employer, and still others will be apparent to one skilled in the art. Thus, if a first employer has a higher general management quality score than another, second employer, then that first employer has an objectively better (more desirable) perceived quality of management relative to the second employer.

The employee sentiment scores may be determined from social media postings as well as from employee surveys, general financial data of the employer, and other sources. Potential employees may express opinions uninhibitedly on social media sites while remaining guarded in internal company surveys. Accordingly, some aspects of the present invention take advantage of this insight to differentially value or weight topic sentiment score values that are derived from opinions expressed on social media higher than those derived from employee survey data, thereby enabling a more accurate evaluation of the true employee voice relative to prior art systems and methods.

The subset entity-topic pairs selected for marketing (at 108, FIG. 4) may be identified by having sentiment scores lower than corresponding scores for the same topic for the second employer. This constrains the subset entity-topic pairs to topics for which the second employer is more desirable relative to the first employer. For example, if one of the topics is "general management quality," and the second employer has a better reputation for hiring, retaining or developing upper management candidates, or employee satisfaction or this topic has trended better over the same period (from the initial time to the current time), then the sentiment "general management quality" topic may be selected as a subset entity-topic pair for marketing (at 108, FIG. 4).

Other constraints for selection of the subset entity-topic pairs for marketing (at 108, FIG. 4) include topics having highest sentiment scores, or scores higher than a specified plurality of others of the topic-entity pairs, for example those each higher than a minimum threshold value, or higher relative to a mean or average value, or greater than a specified number or percentage of other topic differentials, etc.); topics for which the determined score differentials are more significantly negative relative to others of the topics for that same (first) competitor; or for which the determined scores or differential trends are more significantly negative relative to the same topics for the second, marketing employer; or some combination or function of the two comparisons.

Selecting the subset entity-topic pairs for marketing (at 108, FIG. 4) may also consider other attributes or tendencies. For example, topics generating highest social media commentary activity are indicative of higher likelihood of interest and response to associated job offer marketing, regardless of differences in sentiment scores and differential trends over time between topics or between the first and second employer. Topic sentiment scores determined from employee social media postings may be valued or weighted higher over sentiments determined from public surveys, as employees may express opinions more freely and uninhibitedly on social media sites while remaining guarded in internal company surveys. Thus, postings indicating employee dissatisfaction with their current, first employer, on an identified topic may result in flagging of the topic as a key topic.

Other key topic indications may be news feed and financial data relevant to the first and second employers that indicate relatively higher opinions of the public or others with the second employer relative to the first on the topics, or at least dissatisfaction with the first employer. Historical data for either employer or area of work, or across other employers and areas of work may identify key topics that are most likely to generate responses from associated job offer marketing. Thus objective metrics and scores may be assigned to topics based on any of the above (or other attributes apparent to one skilled in the art) and combined to generate a composite key topic metric or score useful in distinguishing the key topics from the remainder others of the topics.

In some aspects marketing efforts executed (at 108, FIG. 4) may be ranked, so that the marketing of the key topics prioritizes those with the highest projected response rates (for example, by numbers or frequencies of emails or candidates directly contacted, costs expended or allocated per topic, etc.)

In some aspects the differential scores are determined via automated sensing of employment brand dynamics of the competitors employing candidates with the desired skill set, for example, by analyzing social network postings.

Measuring actual response rates [$r_m(i, j)$] (at 112, FIG. 4) for responses generated by marketing efforts expended on offers of employment associated with the key topic-employer pairings may be determined through a variety of processes, include metrics with respect to replies from emails to candidates, secondary or follow-up inquiries or communications from said candidates, etc.

Actual costs of marketing to each of the key pairings [$C(a(i, j))$] (at 110, FIG. 4) may include costs of email, public event sponsorship, advertising, publication creation and distribution costs, etc. Some marketing efforts may be more appropriate to a certain topics than others (for example, direct mail with regard to general work/life quality issue topics, or general advertising with regard to salary issues in order to assure privacy), or to certain employers relative to others (public employers may make employee contact information publically available, wherein private employers may keep this information confidential, raising the cost of determining employee email addresses). Accordingly, the marketing costs will likely vary as a function of relative differences in topic or employer from pair to pair.

Aspects of the present invention may incorporate and utilize optimized skill dependent, time varying resume or candidate sourcing rates in determining marketing rates described above. Employer brand values are assessed through automated sensing and analysis of social media blogs, business news and financial performance data, enabling aspects to identify employer and topic pairings to target prospective candidates with the right skills, in the right proportion, at the right time with the right marketing message to maximize employment brand value.

Aspects may thus target and define marketing rates in the right proportion, avoiding over-marketing that would result in loss of brand value among prospective candidates in the prior art. Right Messaging: aspects understand the current dissatisfaction points of a prospective candidate within a current employer as key topics, wherein a key to attracting the candidate is to effectively market to the key topic. Right Time: a message may soon lose its value if not leveraged at the right time within given market dynamics. Aspects avoid this by dynamically determining trends of employer sentiment and revising key topic identification and ranking accordingly, so that marketing efforts may quickly change to address current key topics.

With the amount of competition in a highly dynamic industry, finding the perfect candidate before someone else does can be quite a challenge. It is a herculean task for even the smartest recruiter to efficiently and timely utilize an enormous amount of unstructured and structured dynamic data. Aspects of the present invention provide advantages in dynamic identification of key marketing topics from timely data extraction, quickly filtering out noise (for example, via the stochastic optimization model approach described above) to avoid missing information indicated by the data, as well as data or information overload. Assessment advantages include enabling a user to quickly assess how an organization is perceived as an employer, what's impacting an organization's employment brand, and how other competitors are positioned and perceived. Aspects provide data leverage advantages, enabling a user to approach potential recruits and hone an appropriate messaging to attract the best talent for the recruiting employer.

Aspects provide fully automated systems for the creation and maximization of employment brand value through targeted campaigns including: automated sensing of employment brand dynamics of competitors or other organizations employing candidates with the desired skill set; automatically identifying key differentiating topics and quantifying their differential values in relation to a parent organization; and identifying target competitor employers and their associated differentiating topics that are expected to result in maximal response rate from the targeted candidates, including via use of stochastic optimization structures and systems.

Aspects contact identified candidates at desired sourcing rates, communicating messages identified for a given topic, automatically measuring the response rate of targeted candidates, and adapting response rate models using stochastic learning techniques. Aspects thereby continuously learn and optimize response rates, using an exploration vs exploitation trade-off strategy, which enables learning responses from otherwise low-valued states and actions.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically minimizing marketing rates as a function of optimized response rate models, comprising:

provisioning a configurable cloud computing resource of a shared pool of computing resources to estimate response rates from a plurality of consumers to marketing offers targeted to each of a plurality of topic-entity pairs at respective specified marketing rates, wherein the provisioned cloud computing resource estimates the response rates to the marketing offers as a function of relative differences in consumer sentiment scores determined for each of the topic-entity pairs, wherein entities of the topic-entity pairs are chosen from a plurality of competitor entities that is not inclusive of a first entity, wherein the entities of the topic-entity pairs comprise employers, and wherein the topics of the topic-entity pairs comprise an attribute applicable to the employer for an employee to remain with the employer selected from the group consisting of general management quality, compensation amounts, health benefit values, reward values of employee award and recognition programs, perceived work culture, career advancement opportunities, learning opportunities, employer financial health, strategic growth outlook, and market risks applicable to the employer, wherein the plurality of consumers comprise recruited employee candidates, wherein data for the determined sentiment scores is obtained by the provisioned cloud resource from a computing environment over electronic networks from social media;

identifying a first subset plurality of the topic-entity pairs that each pair a first topic to different ones of the plurality of competitor entities and that have determined consumer sentiment scores that are lower than a consumer sentiment score determined for a pair of the first topic to the first entity, wherein the consumer sentiment score is a quantified value indicative of a relative quality of one entity of the topic-entity pairs to other entities of the topic-entity pairs with respect to one topic;

offering, at their respective specified marketing rates, the marketing offers to the consumers that are each targeted to respective ones of a second subset plurality of the first subset plurality of the topic-entity pairs that each have estimated response rates that meet a threshold response rate constraint;

determining respective costs and actual rates of response from the consumers for the marketing offers targeted to the second subset of the topic-entity pairings;

modeling response rates for the second subset entity-topic pairs to determine modeled response parameters for each of respective ones of topic and entity of the second subset topic-entity pairs as regressions of minimized differences in value between their respective estimated and the actual response rates;

updating values of the modeled response parameters as a function of respective learning parameters that control a speed of learning of values of respective ones of the modeled response parameters; and provisioning the configurable cloud computing resource to minimize the respective specified marketing rates of the second subset entity-topic pairs, wherein the provisioned configurable cloud computing resource minimizes said respective specified marketing rates of the second subset entity-topic pairs to meet the threshold response rate constraint and a marketing cost constraint as a function of the modeled response parameters and minimizing a mean squared error between a total of the estimated response rates and the threshold response rate constraint.

2. The method of claim 1, further comprising:

integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the provisioning the configurable cloud computing resource to estimate the response rates from the plurality of consumers to marketing offers targeted from the first entity to each of the plurality of topic-entity pairs at respective specified marketing rates, the identifying the first subset plurality of the topic-entity pairs, the offering at their respective specified marketing rates the marketing offers to the consumers that are each targeted to respective ones of the second subset of the topic-entity pairs, the determining the respective costs and actual response rates for the marketing offers targeted to the second subset of the topic-entity pairings, the determining for each of the selected subset of the topic-entity pairings, the modeling the response rates to determine the modeled response parameters for the respective topics and entities of the second subset entity-topic pairs, the updating the values of the modeled response parameters, and provisioning the configurable cloud computing resource to minimize the respective specified marketing rates of the second subset entity-topic pairs to meet the threshold response rate constraint and the marketing cost constraint.

3. The method of claim 1, wherein the computer-readable program code is provided as a service in a cloud environment.

4. The method of claim 1, further comprising:
minimizing the respective specified marketing rates of the second subset entity-topic pairs as a function of multiples of respective shadow price parameters and the determined costs for the offerings targeted to the second subset of the topic-entity pairings, wherein the higher the value of the shadow price parameter the smaller an allowable value of the respective determined costs.

5. The method of claim 4, wherein the marketing offers are offers of employment by the first entity, the topics are employment topics, and the consumer sentiment scores are determined from sentiment data comprising opinions expressed on social media by employees of the competitor entities with respect to application of the employment topics to respective paired ones of the competitor entities.

6. The method of claim 5, wherein the consumer sentiment scores comprise trending differential values determined over an interval period of time.

7. The method of claim 6, wherein the employment topics are selected from the group consisting of general management quality, compensation amounts, health benefit values, reward values of employee award and recognition programs, perceived work culture, career advancement opportunities, learning opportunities, employer financial health, strategic growth outlook, and market risks, each applicable to the first employer.

8. The method of claim 7, wherein the sentiment data comprises survey data obtained from the employees of the competitor entities, the method further comprising:
weighting sentiment score values that are derived from the opinions expressed on social media by employees higher than sentiment score values that are derived from the survey data obtained from the employees of the competitor entities.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
provisions a configurable cloud computing resource of a shared pool of computing resources to estimate response rates from a plurality of consumers to marketing offers targeted to each of a plurality of topic-entity pairs at respective specified marketing rates, wherein the provisioned cloud computing resource estimates the response rates to the marketing offers as a function of relative differences in consumer sentiment scores determined for each of the topic-entity pairs, wherein entities of the topic-entity pairs are chosen from a plurality of competitor entities that is not inclusive of a first entity, wherein the entities of the topic-entity pairs comprise employers, and wherein the topics of the topic-entity pairs comprise an attribute applicable to the employer for an employee to remain with the employer selected from the group consisting of general management quality, compensation amounts, health benefit values, reward values of employee award and recognition programs, perceived work culture, career advancement opportunities, learning opportunities, employer financial health, strategic growth outlook, and market risks applicable to the employer, wherein the plurality of consumers comprise recruited employee candidates, wherein data for the determined sentiment scores is obtained by the provisioned cloud resource from a computing environment over electronic networks from social media;
identifies a first subset plurality of the topic-entity pairs that each pair a first topic to different ones of the plurality of competitor entities and that have determined consumer sentiment scores that are lower than a consumer sentiment score determined for a pair of the first topic to the first entity, wherein the consumer sentiment score is a quantified value indicative of a relative quality of one entity of the topic-entity pairs to other entities of the topic-entity pairs with respect to one topic;
offers, at their respective specified marketing rates, the marketing offers to the consumers that are each targeted to respective ones of a second subset plurality of the first subset plurality of the topic-entity pairs that each have estimated response rates that meet a threshold response rate constraint;
determines respective costs and actual rates of response from the consumers for the marketing offers targeted to the second subset of the topic-entity pairings;
models response rates for the second subset entity-topic pairs to determine modeled response parameters for each of respective ones of topic and entity of the second subset topic-entity pairs as regressions of minimized differences in value between their respective estimated and the actual response rates;
updates values of the modeled response parameters as a function of respective learning parameters that control a speed of learning of values of respective ones of the modeled response parameters; and
provisions the configurable cloud computing resource to minimize the respective specified marketing rates of the second subset entity-topic pairs, wherein the provisioned configurable cloud computing resource minimizes said respective specified marketing rates of the second subset entity-topic pairs to meet the threshold response rate constraint and a marketing cost constraint as a function of the modeled response parameters and minimizing a mean squared error between a total of the estimated response rates and the threshold response rate constraint.

10. The system of claim 9, wherein the processor executes the program instructions stored on the computer-readable storage medium via the computer readable memory as a service in a cloud environment.

11. The system of claim 9, wherein the processor executes the program instructions stored on the computer-readable storage medium via the computer readable memory and thereby minimizes the respective specified marketing rates of the second subset entity-topic pairs as a function of a multiple of respective shadow price parameters and the determined costs for the offerings targeted to the second subset of the topic-entity pairings, wherein the higher the value of the shadow price parameter the smaller an allowable value of the respective determined costs.

12. A computer program product for employee candidate marketing as a function of competitor and topic differentiation, the computer program product comprising:

a computer readable storage medium having computer readable program code embodied therewith, wherein the computer readable storage medium is not a transitory signal per se, the computer readable program code comprising instructions for execution by a processor that cause the processor to:

provision a configurable cloud computing resource of a shared pool of computing resources to estimate response rates from a plurality of consumers to marketing offers targeted to each of a plurality of topic-entity pairs at respective specified marketing rates, wherein the provisioned cloud computing resource estimates the response rates to the marketing offers comprise a function of relative differences in consumer sentiment scores determined for each of the topic-entity pairs, wherein entities of the topic-entity pairs are chosen from a plurality of competitor entities that is not inclusive of a first entity, wherein the entities of the topic-entity pairs comprise employers, and wherein the topics of the topic-entity pairs comprise an attribute applicable to the employer for an employee to remain with the employer selected from the group consisting of general management quality, compensation amounts, health benefit values, reward values of employee award and recognition programs, perceived work culture, career advancement opportunities, learning opportunities, employer financial health, strategic growth outlook, and market risks applicable to the employer, wherein the plurality of consumers comprise recruited employee candidates, wherein data for the determined sentiment scores is obtained by the provisioned cloud resource from a computing environment over electronic networks from social media;

identify a first subset plurality of the topic-entity pairs that each pair a first topic to different ones of the plurality of competitor entities and that have determined consumer sentiment scores that are lower than a consumer sentiment score determined for a pair of the first topic to the first entity, wherein the consumer sentiment score is a quantified value indicative of a relative quality of one entity of the topic-entity pairs to other entities of the topic-entity pairs with respect to one topic;

offer, at their respective specified marketing rates, the marketing offers to the consumers that are each targeted to respective ones of a second subset plurality of the first subset plurality of the topic-entity pairs that each have estimated response rates that meet a threshold response rate constraint;

determine respective costs and actual rates of response for the marketing offers targeted to the second subset of the topic-entity pairings;

model response rates for the second subset entity-topic pairs to determine modeled response parameters for each of respective ones of topic and entity of the second subset topic-entity pairs as regressions of minimized differences in value between their respective estimated and the actual response rates;

update values of the modeled response parameters as a function of respective learning parameters that control a speed of learning of values of respective ones of the modeled response parameters; and provisioning the configurable cloud computing resource to minimize the respective specified marketing rates of the second subset entity-topic pairs, wherein the provisioned configurable cloud computing resource minimizes said respective specified marketing rates of the second subset entity-topic pairs to meet the threshold response rate constraint and a marketing cost constraint as a function of the modeled response parameters minimizing a mean squared error between a total of the estimated response rates and the threshold response rate constraint.

13. The computer program product of claim 12, wherein the computer readable program code instructions for execution by the processor cause the processor to minimize the respective specified marketing rates of the second subset entity-topic pairs as a function of a multiple of respective shadow price parameters and the determined costs for the offerings targeted to the second subset of the topic-entity pairings, wherein the higher the value of the shadow price parameter the smaller an allowable value of the respective determined costs.

14. The computer program product of claim 13, wherein the marketing offers are offers for employment by the first entity, the topics are employment topics, and the consumer sentiment scores are determined from sentiment data comprising opinions expressed on social media by employees of the competitor entities with respect to application of the employment topics to respective paired ones of the competitor entities.

* * * * *